(12) United States Patent
Haynold

(10) Patent No.: US 10,277,771 B1
(45) Date of Patent: Apr. 30, 2019

(54) FLOATING-POINT CAMERA

(71) Applicant: Oliver Markus Haynold, Evanston, IL (US)

(72) Inventor: Oliver Markus Haynold, Evanston, IL (US)

(*) Notice: Subject to any disclaimer, the term of this patent is extended or adjusted under 35 U.S.C. 154(b) by 81 days.

(21) Appl. No.: 14/821,778

(22) Filed: Aug. 9, 2015

Related U.S. Application Data (60) Provisional application No. 62/040,373, filed on Aug. 21, 2014.

(51) Int. Cl.
*H04N 1/21* (2006.01)

(52) U.S. Cl.
CPC .................. *H04N 1/2137* (2013.01)

(58) Field of Classification Search
CPC .... H04N 1/2137; H04N 1/2112; H04N 5/772; H04N 5/907; H04N 1/2141; H04N 1/2145; G06K 9/00
See application file for complete search history.

(56) References Cited

U.S. PATENT DOCUMENTS

| | | |
|---|---|---|
| 5,247,366 A | 9/1993 | Ginosar et al. |
| 5,420,635 A | 5/1995 | Konishi et al. |
| 5,517,242 A | 5/1996 | Yamada et al. |
| 5,903,677 A * | 5/1999 | Kosugi ............... H04N 1/2112 358/1.9 |
| 5,929,908 A | 7/1999 | Takahashi et al. |
| 6,061,091 A * | 5/2000 | Van de Poel ............ G06T 5/40 348/241 |
| 6,148,149 A | 11/2000 | Kagle |
| 6,204,851 B1 | 3/2001 | Netschke et al. |
| 6,204,881 B1 | 3/2001 | Ikeda et al. |
| 6,418,245 B1 | 7/2002 | Udagawa |
| 6,496,226 B2 | 12/2002 | Takahashi et al. |
| 6,538,593 B2 | 3/2003 | Yang et al. |
| 6,593,970 B1 | 7/2003 | Serizawa et al. |
| 6,670,993 B1 | 12/2003 | Yamamoto et al. |
| 6,677,992 B1 | 1/2004 | Matsumoto et al. |
| 6,707,492 B1 | 3/2004 | Itani |
| 6,720,993 B1 | 4/2004 | Hwang et al. |
| 6,894,720 B2 | 5/2005 | Zhang |
| 6,952,234 B2 | 10/2005 | Hatano |
| 6,985,185 B1 | 1/2006 | Crawford et al. |
| 7,061,524 B2 | 6/2006 | Liu et al. |
| 7,106,913 B2 | 9/2006 | Castorina et al. |
| 7,133,069 B2 | 11/2006 | Wallach et al. |
| 7,193,652 B2 | 3/2007 | Hori et al. |
| 7,233,619 B1 * | 6/2007 | Roman ................. H04N 19/93 375/240 |
| 7,239,757 B2 | 7/2007 | Kang et al. |
| 7,433,514 B2 | 10/2008 | Sloan |
| 7,454,136 B2 | 11/2008 | Raskar et al. |

(Continued)

OTHER PUBLICATIONS

US 8,957,975 B2, 02/2015, Venkataraman et al. (withdrawn)
US 8,957,978 B2, 02/2015, Venkataraman et al. (withdrawn)

*Primary Examiner* — Luong T Nguyen (57) ABSTRACT

According to some embodiments, a camera captures images in a fixed-point format of a certain bit depth, which are then converted into a floating-point texture by a GPU. After processing for image enhancement in floating-point space, according to some embodiments the images are converted back to a fixed-point representation and stored in non-volatile memory.

16 Claims, 3 Drawing Sheets

(56) References Cited

U.S. PATENT DOCUMENTS

| | | |
|---|---|---|
| 7,518,615 B1 | 4/2009 | Airey et al. |
| 7,522,756 B2 | 4/2009 | Bueno et al. |
| 7,983,496 B2 | 7/2011 | Liu et al. |
| 8,014,445 B2 | 9/2011 | Segall et al. |
| 8,068,140 B2 | 11/2011 | Helbing |
| 8,072,507 B2 | 12/2011 | Fuh et al. |
| 8,159,579 B2 | 4/2012 | Jannard et al. |
| 8,237,730 B1 | 8/2012 | Anderson et al. |
| 8,242,426 B2 | 8/2012 | Ward et al. |
| 8,248,486 B1 | 8/2012 | Ward et al. |
| 8,290,295 B2 | 10/2012 | Criminisi et al. |
| 8,314,847 B2 | 11/2012 | Brunner |
| 8,340,413 B2 | 12/2012 | Cho et al. |
| 8,358,351 B2 | 1/2013 | Brunner et al. |
| 8,363,131 B2 | 1/2013 | Lin |
| 8,406,569 B2 | 3/2013 | Segall et al. |
| 8,452,090 B1 | 5/2013 | Brunner et al. |
| 8,456,547 B2 | 6/2013 | Wloka |
| 8,456,548 B2 | 6/2013 | Wloka |
| 8,456,549 B2 | 6/2013 | Wloka |
| 8,503,539 B2 | 8/2013 | Tran |
| 8,514,934 B2 | 8/2013 | Ward et al. |
| 8,634,476 B2 | 1/2014 | Tran |
| 8,643,769 B2 | 2/2014 | Frantz |
| 8,831,340 B2 | 9/2014 | Paris et al. |
| 8,885,059 B1 | 11/2014 | Venkataraman et al. |
| 8,896,719 B1 | 11/2014 | Venkataraman et al. |
| 8,902,321 B2 | 12/2014 | Venkataraman et al. |
| 8,989,484 B2 | 3/2015 | Moon et al. |
| 9,041,823 B2 | 5/2015 | Venkataraman et al. |
| 9,041,829 B2 | 5/2015 | Venkataraman et al. |
| 9,049,367 B2 | 6/2015 | Venkataraman et al. |
| 9,049,391 B2 | 6/2015 | Venkataraman et al. |
| 9,060,121 B2 | 6/2015 | Venkataraman et al. |
| 9,060,124 B2 | 6/2015 | Venkataraman et al. |
| 9,060,142 B2 | 6/2015 | Venkataraman et al. |
| 9,076,224 B1 | 7/2015 | Shah et al. |
| 9,077,893 B2 | 7/2015 | Venkataraman et al. |
| 2003/0140786 A1* | 7/2003 | Iijima ............... B01D 53/1475 95/168 |
| 2003/0234876 A1* | 12/2003 | Bloom ................ H04N 5/772 348/231.3 |
| 2005/0168583 A1 | 8/2005 | Thomason |
| 2011/0109754 A1 | 5/2011 | Matsunaga et al. |
| 2012/0147953 A1 | 6/2012 | El-Mahdy et al. |
| 2012/0230597 A1 | 9/2012 | Ward et al. |
| 2012/0237130 A1 | 9/2012 | Wang et al. |
| 2012/0314100 A1 | 12/2012 | Frank |
| 2013/0003086 A1 | 1/2013 | Mebane et al. |
| 2013/0034307 A1 | 2/2013 | Jerdev |
| 2013/0091430 A1 | 4/2013 | Zhai et al. |
| 2013/0182756 A1* | 7/2013 | Furlan .................. G06T 5/002 375/240.02 |
| 2013/0262539 A1* | 10/2013 | Wegener ............... G06F 7/483 708/204 |
| 2013/0322753 A1 | 12/2013 | Lim et al. |
| 2014/0078193 A1 | 3/2014 | Barnhoefer et al. |
| 2014/0140615 A1 | 5/2014 | Finlayson et al. |
| 2015/0054999 A1 | 2/2015 | Bock |
| 2015/0055001 A1 | 2/2015 | Bock |
| 2015/0350483 A1* | 12/2015 | Holtsberg ............ H04N 1/2112 348/231.2 |

* cited by examiner

FLOATING-POINT CAMERA

RELATED APPLICATIONS

This application claims priority from my Provisional Patent Application 62/040,373, filed on 21 Aug. 2014, which is hereby incorporated in full into this application.

This application is related to my Utility patent application Ser. No. 14/280,605, filed on 17 May 2014, for a HDR Video Camera, which claims priority from my Provisional Patent Application 61/826,799, filed on 23 May 2013, and also for a HDR Video Camera; both applications are hereby incorporated in full into this application.

FIELD OF THE INVENTION

This invention relates to the field of processing image data in a camera.

PRIOR ART

The following is a tabulation of some patent documents that appear relevant:

U.S. Patents

| Patent Number | Kind Code | Issue Date | Patentee |
|---|---|---|---|
| 6,204,851 | $B_1$ | 2001 Mar. 20 | Netschke et al. |
| 6,538,593 | $B_2$ | 2003 Mar. 25 | Yang et al. |
| 7,518,615 | $B_1$ | 2009 Apr. 14 | Airey et al. |
| 7,522,756 | $B_2$ | 2009 Apr. 21 | Bueno et al. |
| 8,452,090 | $B_1$ | 2013 May 28 | Brunner et al. |
| 8,456,547 | $B_2$ | 2013 Jun. 4 | Wloka |
| 8,456,548 | $B_2$ | 2013 Jun. 4 | Wloka |
| 8,456,549 | $B_2$ | 2013 Jun. 4 | Wloka |
| 8,503,539 | $B_2$ | 2013 Aug. 6 | Tran |
| 8,634,476 | $B_2$ | 2014 Jan. 21 | Tran |
| 8,643,769 | $B_2$ | 2014 Feb. 14 | Frantz |

U.S. Patent Application Publications

| Publication Number | Kind Code | Publication Date | Applicant |
|---|---|---|---|
| 2015/0054999 | $A_1$ | 2015 Feb. 26 | Bock |
| 2015/0055001 | $A_1$ | 2015 Feb. 26 | Bock |

Foreign Application Publications

| Publication Number | Kind Code | Publication Date | Applicant |
|---|---|---|---|
| EP 0,489,552 | $A_2$ | 1992 Jun. 10 | Tindall |
| WO 2014/080068 | $A_1$ | 2014 May 30 | Aarnio |

BACKGROUND

The past two decades have seen first the displacement of traditional film-based photography by digital photography and then the displacement, still going on at the time of this writing, of digital compact cameras by smartphones and similar multimedia devices with built-in cameras. This gives the consumer the opportunity always to have a camera with him, ready to take a picture when the opportunity arises. Yet this development has also brought a certain degradation in quality. Despite the impressive advances in miniature cameras small and cheap enough to be integrated into a smartphone, the laws of physics set limits to the noise and dynamic range of a tiny sensor behind a tiny lens mounted in a device that gets warm during operation. The quality of the images shot with these smartphones is thus often sub-optimal, at least when compared with higher-grade dedicated cameras.

Yet the smartphone revolution has also brought us new opportunities in digital imaging. Smartphones today come equipped with impressively powerful central processing units (CPU) and graphics processing units (GPU) that can perform a lot of mathematical operations in a short time.

It is, therefore, desirable to restore the image quality lost by sensor miniaturization and cost reduction in smartphone cameras by novel uses of the mathematical processing power now available.

A quick review of the patent literature pertinent to the topic:

U.S. Pat. No. 7,518,615 mentions the possibility of using a floating-point frame buffer in order to display an "image recorded by a video camera in very low light, or an infrared image."

U.S. Pat. No. 8,643,769 contemplates a system for specialized applications where image data are captured and processed as floating-point numbers, and U.S. Pat. No. 6,538,593 teaches in a similar direction.

European patent application EP 0,489,552 teaches the use of a processor that can simultaneously execute a non-floating point operation and one or a few floating-point operations in an imaging system that first converts image data from high-dynamic range integer representation to floating point representation and then back to integer representation at a lower dynamic range. A similar system taught is in U.S. Pat. No. 7,522,756.

U.S. Pat. Nos. 8,503,539 and 8,634,476 teach the use of a GPU "designed to perform fast execution of integer and floating-point arithmetic" in an image-capture apparatus.

U.S. Pat. No. 8,452,090 and application WO 2014/080068 discuss the use of GPUs for Bayer demosaicking. U.S. Pat. No. 8,452,090 appears to be implying that this processing be done representing luminance data as 8-bit integer numbers since it suggests the use of the RGBA storage format, even though a camera image does not have an alpha channel, which with present GPU architectures appears to make sense primarily for an encoding in 8-bit integers for each channel since the addition of an unused alpha channel in that case makes each pixel 32 bits wide, which brings advantages for memory access.

US Patent Applications 2015/0054999 and 20157/00575001 teach a camera image sensor that out-puts luminance readings as floating-point numbers.

SUMMARY

According to some embodiments, a camera captures images in a fixed-point format of a certain bit depth, which are then converted into a floating-point texture by a GPU. After processing for image enhancement in floating-point space, according to some embodiments the images are converted back to a fixed-point representation and stored in non-volatile memory.

Advantages

Some advantages of some embodiments include:
a) Exposure parameters that previously were possible only with specialized and expensive camera hardware become attainable on cheap and compact mass-market cameras, such as those found in smartphones. In particular, it is possible to obtain arbitrarily long exposures, corresponding to a lower sensitivity and lower noise than what the physical camera sensor is capable of, and to obtain fusion exposures of a higher dynamic range than what the camera sensor is capable of.

b) Floating-point representation of images in an intermediate image processing stage avoids the need for clumsy representations such as 16 bit for luminance and two times eight bits for chrominance, and the associated complicated math.

c) Massively parallel execution of floating-point math makes image improvements at the time of capture possible that would be very slow or impossible using a more complicated fixed-point workflow.

d) The dynamic range of 32-bit per sample image representations greatly simplifies the math and removes the need for computationally expensive encoding tricks.

DRAWINGS—REFERENCE NUMERALS

100 Camera image (8I), 8-bit integer/sample
102 Camera image (8I), 8-bit integer/sample
104 Camera image (8I), 8-bit integer/sample
106 Merger shader
108 Merged image ins(32F), 32-bit floating point/sample
110 Mipmap of merged image, 32-bit floating point/sample
112 Tonemapper shader
114 Finished image (8I), 8-bit integer/sample
200 Camera image (8I), 8-bit integer/sample
202 Camera image (8I), 8-bit integer/sample
204 Camera image (8I), 8-bit integer/sample
206 Merger shader
208 Merged image (32F), 32-bit floating point/sample
210 Tonemapper shader
212 Finished image (16I), 16-bit integer/sample
300-322 labeled on drawing

DETAILED DESCRIPTION—FIGS. 1 & 3—FIRST EMBODIMENT

Figure 3:
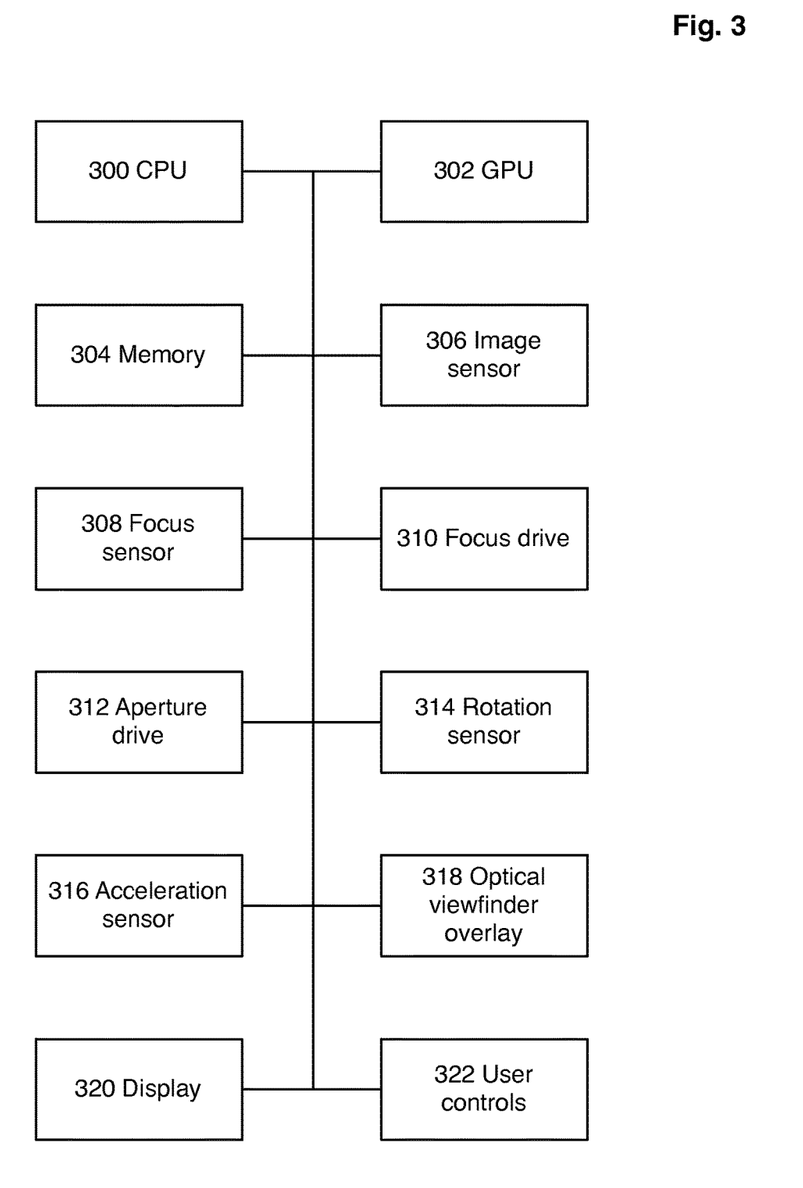
FIG. 3 shows a schematic data bus architecture of the first and second embodiment.

The first embodiment is a portable camera. Its broad architecture is shown in FIG. 3. The camera may be equipped with a CPU 300, a GPU 302, and memory 304. The memory 304 may be shared between the CPU and the GPU, or there may be separate memory for the CPU and for the GPU. The memory 304 may also comprise both volatile and non-volatile memory. The GPU 302 may be a massively parallel processor capable of simultaneously executing operations on data arrays in parallel on dozens or even hundreds or thousands of cores. The camera is equipped with at least one image sensor 306 and may also be equipped with a focus sensor 308. The focus sensor 308 may be a separate phase detection sensor, a group of phase-detection sensors integrated into the image sensor 306, or it may be omitted if the camera is uses contrast on the image sensor 306 for focus operation or is of a fixed-focus type. The camera may also comprise an electromechanical focus drive 310 and aperture drive 312. It may further comprise a rotation sensor 314 and an acceleration sensor 316. The camera may comprise an optical viewfinder with an electronic overlay 318 and/or a display 320. It may also comprise user controls 322 such as a shutter button and control buttons or a touchscreen. These components may be connected by one or more bus systems.

Figure 1:
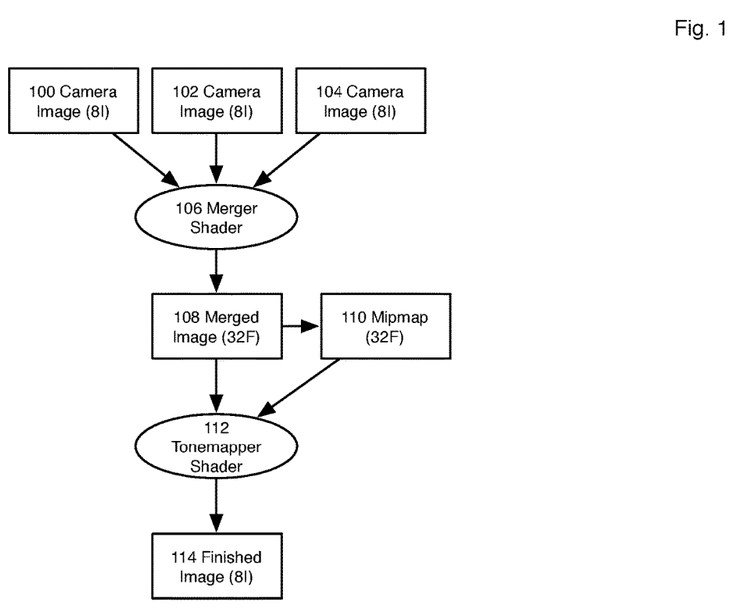
FIG. 1 shows the data flow of the first embodiment.

The data flow of the first embodiment is shown in FIG. 1. This embodiment may be implemented as an 'app' on a smartphone. The smartphone may be equipped with a GPU and GPU driver conforming to the OpenGL® ES 3.0 standard or higher. This is, for example, true of the iPhone® 5S and higher running iOS™ 8 and higher, made by Apple of Cupertino, Calif. This first embodiment is a high-dynamic-range camera, which creates still images or optionally also movies of a much higher dynamic range than is natively possible with the phone's built-in sensor.

The control software of the app instructs the camera to take three exposures at different exposure biases, camera image (8I) 100, camera image (8I) 102, and camera image (8I) 104, for example one image with an exposure bias of 0, one with a bias of −2 EV units, and one with a bias of +2 EV units. These images are created by the built-in camera as 8-bit integer representations with three color channels, corresponding to Red, Green, and Blue. An integer value of 0 stands for no appreciable light at the pixel for that color channel, and an integer value of 255 represents sensor saturation for that pixel and channel.

The merger shader 106 may be implemented as an OpenGL ES shader in the OpenGL ES Shading Language, version 3 or higher. The three images, camera image (8I) 100, camera image (8I) 102, and camera image (8I) 104 from the camera get converted into OpenGL ES textures. The merger shader 106 then merges these 8-bit images into a merged image 108, which may be stored in memory as an OpenGL ES texture with three color channels, corresponding to Red, Green, and Blue, and 32-bit floating point numbers representing each channel for each pixel. The semantics of the floating point numbers may correspond to those proposed in the IEEE Standard for Floating-Point Arithmetic (IEEE 754).

The merger shader 106 may calculate the value for each pixel in the merged image 108 as a weighted average of the exposure-corrected and linearized value of the corresponding pixel in the three input images. First, we define the linearization of the value of each pixel and the standardization of its exposure value. For example, if the images are delivered in sRGB format, this may proceed as $$lin(v_{i;x;y;c}) = (EV_i - EV_2)^2 \begin{cases} \dfrac{v_{i;x;y;c}}{12.92}, & v_{i;x;y;c} \leq 0.04045 \\ \left(\dfrac{v_{i;x;y;c} + 0.055}{1.055}\right)^{2.4}, & v_{i;x;y;c} > 0.04045 \end{cases} \quad (\text{I})$$

where $v_{i;x;y;c}$ is the pixel value of image i, with a value of 0 corresponding to the first and a value of 2 corresponding to the third image, at the pixel coordinates x and y for color channel c. The OpenGL ES logic by itself converts the integer values between 0 and 255 to floating point values between 0 and 1 on loading. $EV_i$ is the exposure value for the image i and we assume that the third image is the one with the highest exposure value; if the sensor sensitivity was changed between exposures, the EV value gets standardized, for example to the EV value at a sensitivity of ISO 100. If the camera uses an image transfer function other than sRGB, those skilled in the art may replace the sRGB formula above by a suitable approximation of the inverse of that camera's image transfer function.

We then take a weighted average of the linearized values for the three exposures by $$\hat{v}_{x;y;c} = \frac{\sum_{i} (lin(v_{i;x;y;c}))((0.5 - v_{i;x;y;c})^2 + 10^{-6}))}{\sum_{i} ((0.5 - v_{i;x;y;c})^2 + 10^{-6})} \quad (2)$$

so that the weight for each exposure is highest when the that pixel and channel for that exposure has a value of medium intensity and lowest when it has a value of very high or very low intensity. Those skilled in the art may modify this weighting scheme depending on the image sensor used and aesthetic effect desired, for example by giving the highest weights to pixel values around 0.8. The minimum weight of $10^{-6}$ prevents the denominator from taking unduly small values. It is also possible to include a deghoster than takes one input image as a reference image and discards or reduces in weight pixel values from the other images that are incompatible with the pixel value of the reference image, as explained in my patent application Ser. No. 14/280,605.

All of the steps explained for the merger shader 106 can be implemented and executed very speedily as a single OpenGL ES shading program. Thus, after execution of the merger shader 106, we now had a merged image with 32-bit floating point numbers representing each color channel for each pixel as an OpenGL ES texture 108.

The tonemapper shader 112 will need various levels of blur on the image to calculate adaptive luminance. It is possible to obtain this by calculating several textures using Gaussian blur of various strengths, but we are using a much faster method here. Using the OpenGL ES function glGenerateMipmap( ) we are calculating a mipmap 110 of the merged image (32F) 108 which becomes attached to merged image (32F) 108. Mipmap calculation is much faster than calculating Gaussian blur, especially since the glGenerateMipmap( ) routine provided by the graphics hardware tends to be very aggressively optimized. Thus now we have a merged image of the three exposure as well as a mipmap of that image, both as 32-bit floating point numbers stored in an OpenGL ES texture. These become the input of the tonemapper shader 112. In order to facilitate interpolated access to the mipmap, we use the OpenGL ES function glTexParameteri( ) to set GL_TEXTURE_MIN_FILTER to GL_LINEAR_MIPMAP_LINEAR and GL_TEXTURE_MAG_FILTER to GL_LINEAR for the texture holding merged image (32F) 108 with its mipmap 110. Alternatively, if the GPU used is sufficiently fast, instead of calculating a mipmap one may calculate an array of images at original size at progressively stronger levels of Gaussian blur which will be used in place of mipmap 110.

The tonemapper shader 112 now calculates for each pixel an adaptive luminance, compares it with the luminance of that pixel, and makes an adjustment to the pixel's luminance so as to enhance its contrast with the adaptive luminance value, similar to the method in my patent application Ser. No. 14/280,605. For this, the tonemapper shader 112 may transform the 32-bit floating-point RGB values into 32-bit floating point values in the YUV color space, representing luminance and chromaticity. The tonemapper shader 112 may then calculate an adaptive luminance by comparing the luminance represented by the pixel's Y component with the luminance value of increasingly coarse levels of the mipmap 110. To obtain these increasingly coarse levels of the mipmap, the shader may use the textureLod( ) function of the OpenGL ES Shading language. The tonemapper shader 112 will start at the finest-resolution mipmap image, which has half the resolution of the main image, and obtain an interpolated pixel value for this mipmap level, and calculate the luminance for it. If this luminance is within a certain band, for example between 90% and 111%, of the original pixel's luminance, the tonemapper shader 112 will move down to the next-lower level of resolution and make the same test there, and so on until either the tonemapper shader 112 finds a mipmap level where the luminance falls out of the specified band or the tonemapper shader 112 arrives at the highest mipmap level that corresponds to only one by one pixel resolution. The tonemapper shader 112 will then use the last luminance value it has encountered that did not fall outside of the specified band as the adaptive luminance. In order to increase regional contrast in the picture, the tonemapper shader 112 will now increase the difference between the pixel's luminance and its adaptive luminance by a given factor, which may be user-adjustable, and which may be 30%. By way of example, if the pixel's luminance is 0.5 and the adaptive luminance found in the mipmap is 0.56, the tonemapper shader 112 may set the new luminance of the pixel to 0.5+0.3(0.5−0.56)=0.482, which is to say because the pixel is darker than its neighborhood, the tonemapper shader 112 makes it somewhat darker yet. Many modifications of this basic scheme are possible, for example using decreasing weights for each mipmap level depending on its difference to the previous mipmap level instead of cutting off at one specific mipmap level.

The tonemapper shader 112 then finishes the pixel by applying linear transformations, i.e., addition and multiplication, the values of which may be user-adjustable, to the YUV components. For example, it is often desirable to shrink the Y component so that is does not go below 0 or above 1 and to increase color saturation somewhat. The shrinkage of the Y component may be chosen so that the brightest possible pixel value from the original exposure with the highest exposure value just corresponds to a brightness of 1 in the finished pixel. Then the tonemapper shader 112 converts these modified YUV values into sRGB color space and writes out the finished image into the texture holding the finished image (8I) 114, which may represent each pixel as an 8-bit unsigned integer. After all pixels have been processed by tonemapper shader 112, the texture holding the finished image (8I) 114 contains the finished image which may be converted by the CPU or the GPU into a standard image file format such as JPEG or TIFF or in the case of a video format into a frame of a video file and is then written out to non-volatile memory on the device.

By repeating this process over and over for new exposures, for example 24 times per second, this processing logic can not only generate tonemapped still images but tonemapped movies rendered in real time as well.

The reader will see that the use of 32-bit floating-point representations of pixel values allows superior preservation of detail through processing stages compared to lower bit resolutions. At the same time, the use of floating-point representations instead of integers greatly simplifies the logic of the shaders. This simplification can make up for the extra memory cost of the floating-point representation. In particular, in the workflow shown, we needed space for only one 32-bit floating point texture, plus an additional third of that texture's memory space for the mipmap. Obtaining image output of similar quality using integer textures, for example encoding the Y channel in 16 bit and the two luminance channels in 8 bit each of an 8-bit integer RGBA texture, takes a lot of additional computations and more complex memory access. On today's mobile CPUs the speed of these operations still would often be unsatisfactory, but by tying in the massively parallel floating-point processing capability of a modern GPU and by using its highly optimized mipmap routine as a replacement for a manually computed Gaussian blur, we obtain a speed that can very quickly render still images at very high resolutions and can even process motion pictures at high-definition resolutions in real time. Even though more data are moved than with techniques using lower bit depths, overall execution speed may increase since the greater logical simplicity allows the GPU to use more efficient memory access and caching patterns.

SECOND EMBODIMENT: FIGS. 2 & 3

Figure 2:
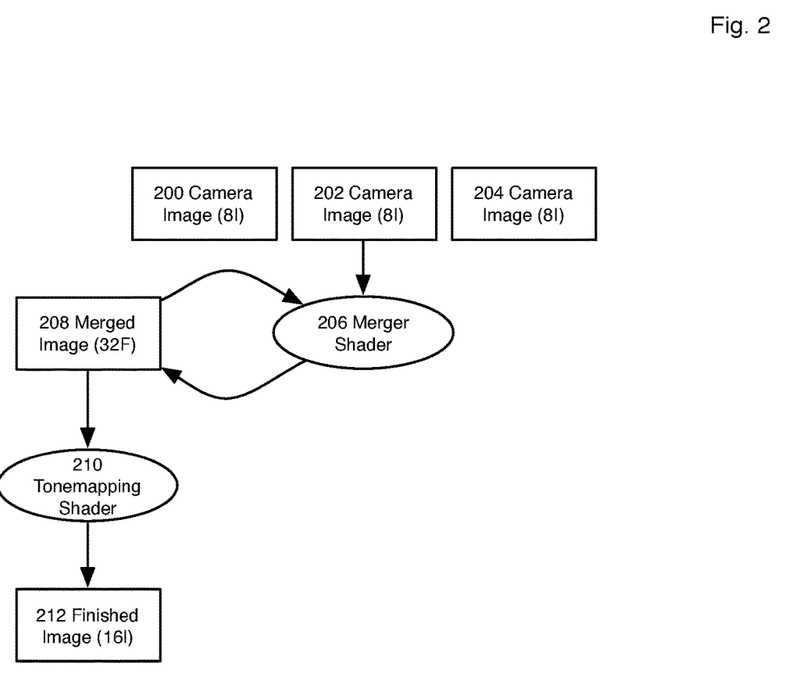
FIG. 2 shows the data flow of the second embodiment.

The second embodiment is a camera with a long-exposure mode in high dynamic range. Its architecture may be as discussed for the first embodiment and shown in FIG. 3. It, too, may be realized on a cell phone platform equipped with a camera and a GPU supporting OpenGL ES version 3.0 or higher. The goal of the second embodiment is to obtain long exposures which may be almost arbitrarily long, and to obtain them at a higher bit depth and thus dynamic range than that of the built-in camera. This is on the one hand useful for noise reduction in night scenes. On the other hand it is also useful for artistic effect. For example a long exposure under broad daylight, which with conventional means is difficult to achieve and often requires very specialized filters, makes it possible to obtain a photo in which clouds dissolve into a dreamy cream effect and busy roads or other public spaces appear empty. The data flow of the second embodiment is shown in FIG. 2.

The camera shoots a sequence of images, one after another. FIG. 2 shows three such camera images (8I), 200, 202, and 204, but these are merely representative of hundreds or thousands of image frames that may be generated in actual application. The input camera images (8I) 200, 202, and 204 are converted to a suitable memory representation in 8-bit integer per sample representation, which may be an OpenGL texture. As it will become apparent from the processing logic discussed below, only one of these images needs to be present in memory at a given time. Thus the use of thousands of such captured images is possible without a corresponding increase in memory use.

The merger shader 206 may be implemented as an OpenGL ES fragment shader. It combines the current camera image 202 with the contents of the accumulation buffer containing the merged image (32F) 208, which may be a 32-bit per sample floating point OpenGL ES texture. First, the values coming from the camera get linearized as in the first embodiment. This linearization may also include an exposure-value adjustment standardizing the exposure value of the image, for example so that the linearized values for each incoming image are the ones that would have been obtained with the exposure value of the first image that came in during this long exposure. They then get combined with the contents of the merged image buffer 208 with a weight of $$\hat{v}_{n,x,y,c} = \left(1 - \frac{1}{n+1}\right)\hat{v}_{n-1,x,y,c} + \frac{1}{n+1} lin(v_{n-1,x,y,c}) \quad (3)$$

where $\hat{v}_{n,x,y,c}$ is the value of the accumulation buffer 208 after the nth image was processed for the pixel at x and y and color channel c, and lin ($v_{n-1,x,y,c}$) is the corresponding linearized value from the new exposure coming in. Thus for the first image coming in, we have n=0 and thus the previous contents of the accumulation buffer get discarded and replaced by the new image. For the second image, the weight of the new image will be ½ and thus it will have equal weight with the previous image; the third image will have half of the weight of the two images already accumulated, and so on. In this way, the accumulation buffer will contain an average of all the previous light values for each pixel.

It should be noted here that if the embodiment is implemented on an OpenGL ES 3.0 platform, the memory model of that platform strictly speaking does not permit using the same texture for input and output in one shader as we are doing here. On many platforms, the method as proposed will work anyhow because each pixel depends only on the pixel in the same location in the previous version of the accumulation buffer. On platforms where this does not work, one can make the implementation standard-compliant by replacing the buffer containing the merged image (32F) 208 with two buffers A and B. For the first image, the rendering target is A (and B may be formally an input but will have a weight of zero with the formula given). For the second image the rendering target is B and the input comes from buffer A. For the next image, the rendering target will be A again with the input from coming B. This ping-pong pattern will avoid using the same texture for input and output, though at the cost of twice the memory consumption.

When the exposure is finished, the tonemapper shader 210, which may also be an OpenGL ES shader, turns the contents of the buffer holding merged image (32F) 208 into a representation suitable for storage, the finished image (16I) 212, which may be a 16-bit integer per sample OpenGL ES texture. This process may include linear transformations to scale luminance and chromaticity, or it may also include more advanced operations known in the art, such as local contrast enhancement. The contents of this texture are then stored into the device's non-volatile memory with the CPU converting the data into an appropriate file format such as TIFF.

It can be useful to store the effective exposure parameters of this long exposure in the image file's metadata. The effective aperture is the actual camera aperture for each of the camera images (8I) 200, 202, and so on; in order to have a consistent depth of field, it will normally be advisable not to modify aperture between exposures and to compensate for changing lighting conditions through changes in sensor sensitivity and exposure time for each exposure. The effective exposure time is the time between the first shot camera image (8I) 200 and the last shot taken, which may be anywhere from a fraction of a second to many hours. The effective ISO speed value can then be calculated as $$\hat{s} = \frac{\sum_{i<n} t_i s_i}{\hat{t}_n} \quad (I)$$

where $\hat{s}$ is the effective ISO speed for the combined exposure, n is the number of image frames that have been combined into that exposure, $\hat{t}$ is the effective exposure time for the long exposure, $t_n$ is the actual exposure time of image frame i, and $s_i$ is the ISO speed of image frame i. In this way, it is possible to obtain extremely small ISO speeds that the physical camera sensor would not be capable of.

The reader will see that this embodiment makes it possible to take long exposures both in dark conditions and in conditions of bright daylight. The use of an intermediate floating-point representation, or alternatively but probably less conveniently of an integer representation, of sufficient bit depth is important here. If, for example, the merged image was stored in an 8-bit per sample integer representation, the weight of a new image in the summation scheme shown would after a few exposures become so low that new incoming images would not get reflected in the merged image; at the latest after 256 images neither complete darkness nor complete sensor saturation would modify the merged image at all. The use of a 32-bit representation allows very fine-grained merging of many frames (in principle, up to about 17 million exposures could be combined). A 32-bit per sample integer representation would also work for this purpose, but 32-bit integer math is not usually supported natively by today's mobile GPUs whereas 32-bit floating-point is and also makes the math more convenient. In this embodiment, too, it is the speed of the GPU with its massively parallel execution that allows us to process new image frames in real time as they come in even on portable devices such as smartphones or multimedia players.

The scheme discussed here may use input frames that are either already demosaicked or, in the case of a sensor using a Bayer or similar pattern, of raw sensor readings not yet demosaicked. In the latter case, the computational effort of demosaicking each frame can be saved, allowing faster processing, and demosaicking may be done as part of the finishing shader and tonemapper 210.

The methods of the first and second embodiment may also be combined in order to obtain a tone-mapped HDR image from a long exposure, which can reveal great detail across a large dynamic range from a static scene or produce interesting artistic effects in moving scenes.

THIRD EMBODIMENT

The previous embodiments were primarily described in terms of the device's camera module generating images in RGB format. From some cameras it is possible to obtain raw sensor data with each pixel corresponding to only one color value, for example arranged in a Bayer pattern. According to a third embodiment of the invention, the camera's raw data are loaded by a GPU as a monochrome texture. The GPU then uses a 32-bit floating point RGB texture to store an intermediate demosaicked picture in RGB format, where the demosaicking method may be nearest-neighbor, bilinear interpolation, or one of the other demosaicking methods known in the art. Either only one exposure from the sensor or several exposures of equal or of different exposure settings may be used as input data for this intermediate floating-point image. The GPU then proceeds with a tone-mapping algorithm as in the first embodiment, starting with the floating-point texture as merged image 108 in the first embodiment and then proceeding with the remaining steps from the the first embodiment. This allows the use of a non-local tonemapping method in real-time, fast enough for video recording. Demosaicking into a bit depth higher than the sensor allows to preserve more detail generated by the demosaicking algorithm, which helps to reduce artifacts such as banding.

CONCLUSION, RAMIFICATIONS, AND SCOPE

Accordingly, the reader will see that the floating-point camera shown allows new exposure modes, such as quickly processed HDR exposures, fast enough to be suitable for use in a video camera, or HDR exposures with long exposure times, to be taken on devices such as smartphones with relatively limited cameras but increasingly powerful GPUs. In either case, the effect is to use math to generate pictures that are more information-rich than what the camera sensor can provide with a single exposure. However, the methods discussed are also useful for processing only a single sensor exposure, as discussed in the third embodiment, to prevent the introduction of artifacts from insufficient bit depth of intermediate image representations.

There are three main factors allowing new photographic possibilities in the embodiments shown. First, storing intermediate representations of the image at a higher bit-depth than the one at which the images are being captured makes it possible to ag-gregate and manipulate images without loss of information. Second, representing these images by floating-point numbers makes it possible to work with linearized representations of light intensity, greatly simplifying the math as the images pass through the processing algorithms. The human eye is sensitive to light in approximately logarithmic fashion. That is to say, we perceive the difference between a light source of a given value and a light source of 90% the intensity of that first light source as about the same difference, no matter what the absolute level of luminance is. For integer representations of light intensity, it is therefore often advantageous to encode light intensity in a non-linear fashion, such as the encoding of sRGB or logarithmic encoding, which makes image processing more difficult and computationally expensive. Floating-point numbers are already encoded in a logarithmic manner, allowing us to store linearized light intensities directly into the floating-pointing image representation and to do math using very fast hardware-assisted routines without explicitly encoding and decoding light intensity in a non-linear fashion. Third, the use of massively parallel processors, such as modern mobile GPUs, allows us to do this processing in real time as the image is being captured, whereas the prior art doing floating-point processing of images on CPUs was largely limited to processing the images in a separate step after they were captured and not in real time. This allows photographers to capture highly detailed images in real time from a battery-operated, highly portable camera, such as a smartphone.

Although the description above contains many specificities, these should not be construed as limiting the scope of the embodiments but as merely providing illustrations of some of several embodiments. For example, although we have given examples in the context of OpenGL ES to control a GPU, other languages, such as Apple's Metal™, may be used, or the massively parallel processing of floating-point math may be executed not on a GPU at all but on another type of massively parallel processor, such as an FPGA programmed for the purpose. We also assumed use of one camera in the embodiments shown, but it is equally possible to use the techniques described to merge not several images taken consecutively by one camera, but several images taken simultaneously or consecutively by multiple cameras built into the same device, or by different sensor areas or sensors of the same camera.

For clarification of the claims, we do understand a scenario where, for example, an image stored in an 8-bit integer form is being loaded pixel by pixel by a GPU, converted into a floating-point representation there, manipulated, and then written back into another 8-bit integer texture not to be a temporary floating-point representation of that image, since in that scenario only a few pixels at a time are available in floating-point format, but there is never a representation of a substantive part of the image in floating-point form.

Thus the scope of the embodiments should be determined by the appended claims and their legal equivalents rather than by the examples given.

I claim:

1. A camera comprising an image sensor, a massively parallel processor, and memory addressable by said massively parallel processor,
said camera being adapted to convert one or several image frames delivered by said image sensor into a temporary image representation in said memory substantively at a time when said one or several image frames are taken,
said temporary image representation being encoded as floating-point numbers comprising a mantissa and an exponent for at least one image channel, and
said floating-point numbers being encoded with more bits per pixel and channel than a number of bits per pixel and channel corresponding to a useful bit depth of said image sensor,
said camera being further adapted to compute a rendered image by said massively parallel processor, and retrieving pixels from said temporary image representation and performing operations to adjust the appearance of said temporary image representation in a parallel computation substantively at a time when said one or several image frames are taken.

2. The camera of claim 1 where said camera is portable.

3. The camera of claim 1 where said massively parallel processor is a graphics processing unit.

4. The camera of claim 1 where said floating-point numbers are being represented with at least 32 bits per a floating-point number.

5. The camera of claim 1 where said one or several image frames, comprising a plurality of pixels, delivered by said image sensor are delivered to said massively parallel processor as raw images with one channel where each pixel implicitly carries color information from knowledge of an arrangement of different color sensitivities of said plurality of pixels on said image sensor.

6. A camera comprising an image sensor, a massively parallel processor, and memory addressable by said massively parallel processor,
said camera being adapted to convert one or several image frames delivered by said image sensor into a temporary image representation in said memory addressable by said massively parallel processor substantively at a time when said one or several image frames are taken,
said temporary image representation being encoded with at least 24 bits per pixel and channel for at least one image channel, and
said temporary image representation being encoded with more bits per pixel and channel than a number of bits per pixel and channel corresponding to a useful bit depth of said image sensor, said camera being further adapted to compute a rendered image by said massively parallel processor, and retrieving pixels from said temporary image representation and performing operations to adjust the appearance of said temporary image representation in a parallel computation substantively at a time when said one or several image frames are taken.

7. The camera of claim 6 where said camera is portable.

8. The camera of claim 6 where said massively parallel processor is a graphics processing unit.

9. A machine-implemented method, comprising automatically retrieving one or several image frames from an image sensor,
converting said one or several image frames delivered by said image sensor into a temporary image representation in electronic memory substantively at a time when said one or several image frames are taken,
said temporary image representation being encoded as floating-point numbers comprising a mantissa and an exponent for at least one image channel, and
said floating-point numbers being encoded with more bits per pixel and channel than a number of bits per pixel and channel corresponding to a useful bit depth of said image sensor, and
computing a rendered image by a massively parallel processor, and retrieving pixels from said temporary image representation and performing operations to adjust the appearance of said temporary image representation in a parallel computation substantively at a time when said one or several image frames are taken.

10. The method of claim 9 where said image sensor, said electronic memory, and said massively parallel processor are part of a portable apparatus.

11. The method of claim 9 where said massively parallel processor is a graphics processing unit.

12. The method of claim 9 where said floating-point numbers are being represented with at least 32 bits per a floating-point number.

13. The method of claim 9 where said one or several image frames, comprising a plurality of pixels, delivered by said image sensor are delivered to said massively parallel processor as raw images with one channel where each pixel implicitly carries color information from knowledge of an arrangement of different color sensitivities of said plurality of pixels on said image sensor.

14. A machine-implemented method, comprising automatically retrieving one or several image frames from an image sensor,
converting one or several image frames delivered by said image sensor into a temporary image representation in electronic memory substantively at a time when said one or several image frames are taken,
said temporary image representation being encoded with at least 13 bits per pixel and channel for at least one image channel, and
said temporary image representation being encoded with more bits per pixel and channel than a number of bits per pixel and channel corresponding to a useful bit depth of said image sensor, and
computing a rendered image by a massively parallel processor, and retrieving pixels from said temporary image representation and performing operations to adjust the appearance of said temporary image representation in a parallel computation substantively at a time when said one or several image frames are taken.

15. The method of claim 14 where said image sensor, said electronic memory, and said massively parallel processor are part of a portable apparatus.

16. The method of claim 14 where said massively parallel processor is a graphics processing unit.

* * * * *